UNITED STATES PATENT OFFICE.

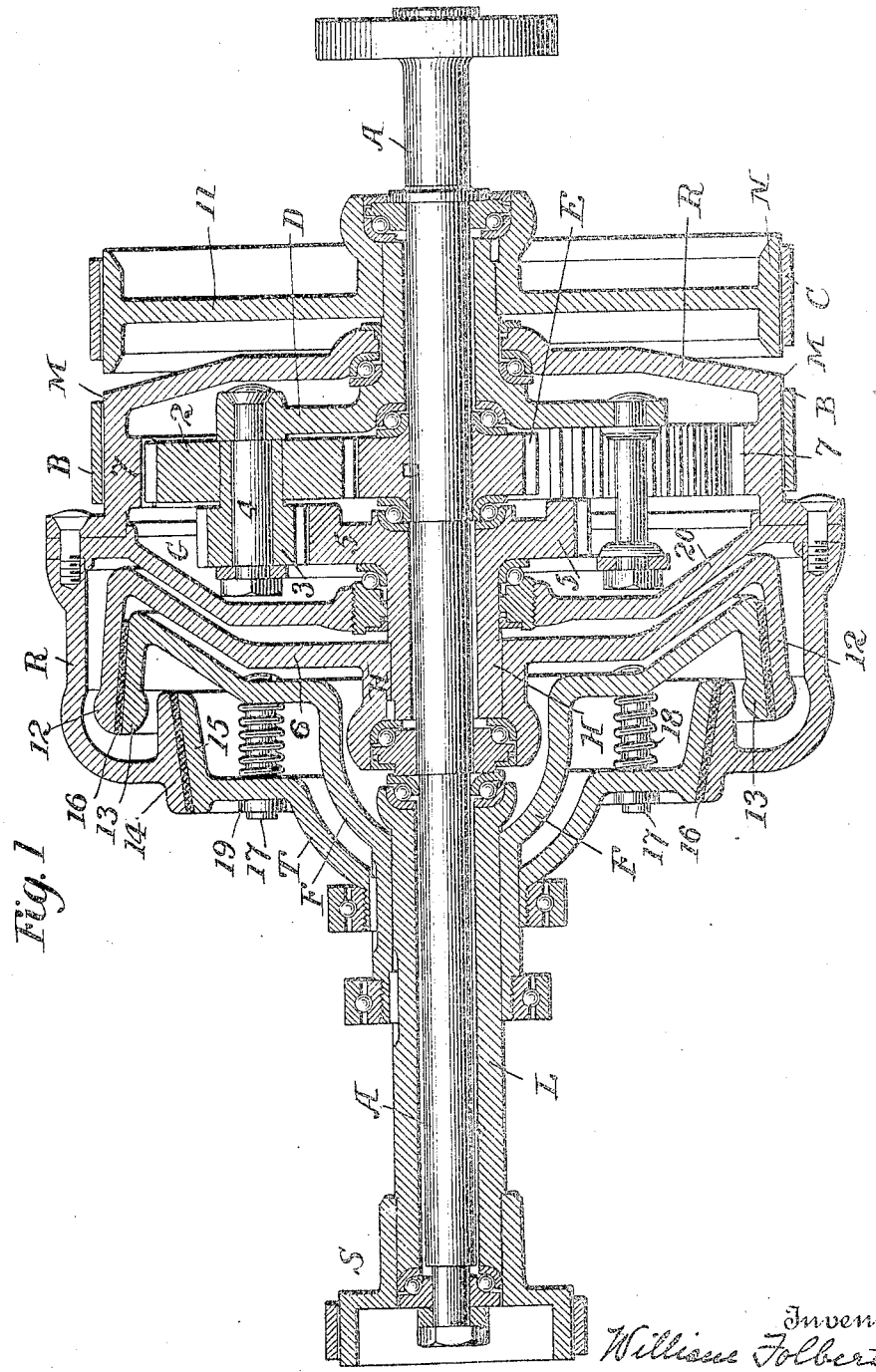

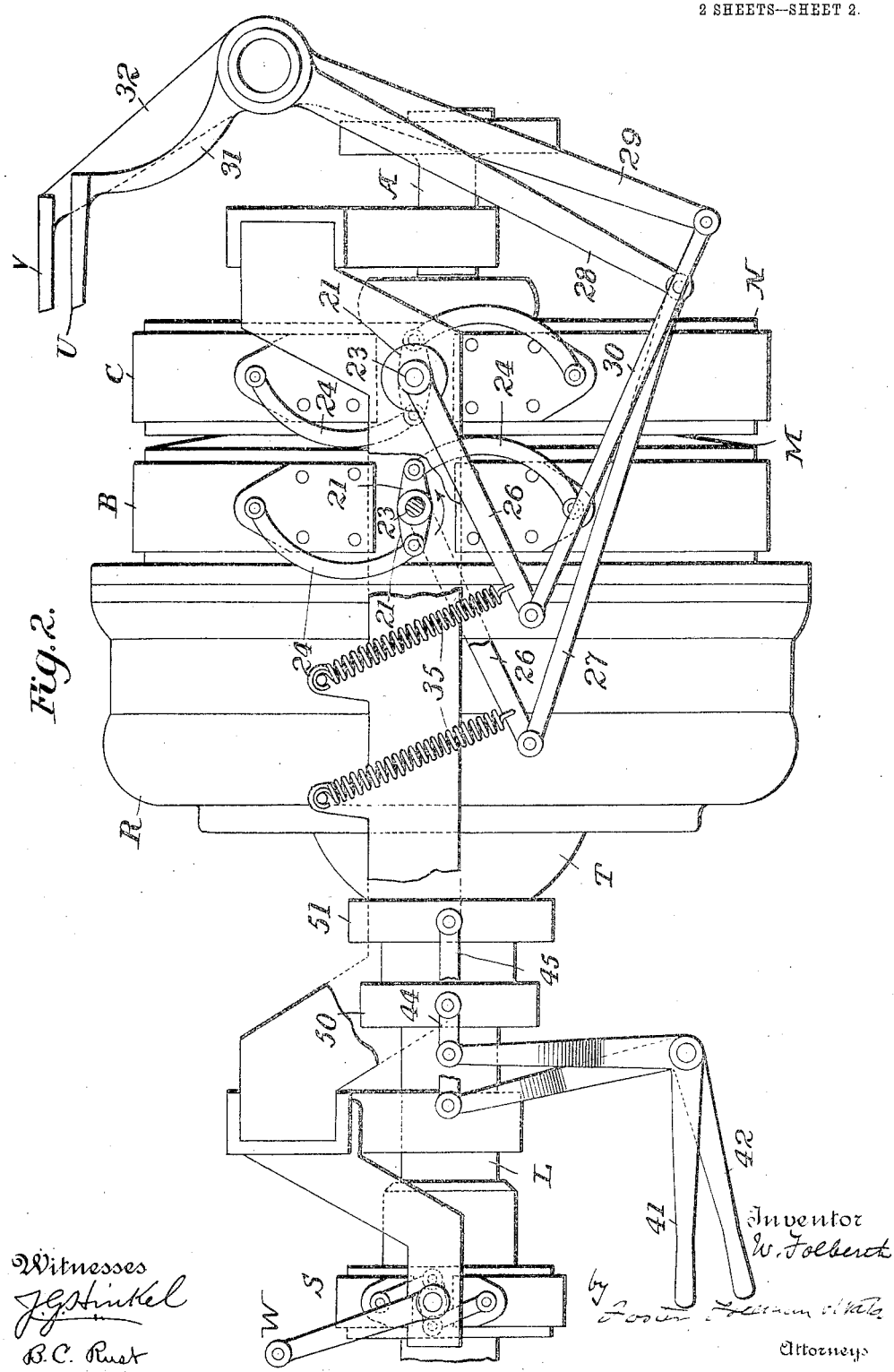

WILLIAM FOLBERTH, OF CLEVELAND, OHIO.

TRANSMISSION-GEAR.

No. 817,908. Specification of Letters Patent. Patented April 17, 1906.

Application filed October 31, 1905. Serial No. 285,322.

*To all whom it may concern:*

Be it known that I, WILLIAM FOLBERTH, a citizen of the United States, residing at Cleveland, in the county of Cuyahoga and State of Ohio, have invented certain new and useful Improvements in Transmission-Gears, of which the following is a specification.

My invention relates to transmission-gears, and has for its object to secure three speeds with a minimum number of brakes and clutch devices and a minimum amount of gearing, to which end I have devised the construction hereinafter set forth, and illustrated in the accompanying drawings, in which—

Figure 1 is a longitudinal section of a transmission-gear embodying my improvements; Fig. 2, an external view of the same in connection with the means for applying the brakes and clutches.

The driving member E of the transmission-gear is a pinion to which rotation is imparted in any suitable manner—as, for instance, from a shaft A, to which rotation is imparted by the engine, (not shown,) which shaft also serves as a support for the other parts of the gear, suitably mounted thereon.

The driving-pinion E engages the larger sections 2 of a plurality of twin pinions G, carried by studs 4 on a gear-frame D, rotating freely on the shaft, the other and smaller sections 3 of the twin pinions engaging a gear 5 upon a clutch member H, rotating freely on the shaft and having a web or disk 6, terminating in an inclined clutch-flange 12, with the inner face of which is adapted to engage the flange 13 of a clutch member F, sliding upon but keyed to turn with a sleeve L, that rotates upon the shaft A and is connected by a universal connection at S or otherwise with the shaft-axle or other part to be driven.

The larger sections 2 of the twin pinions G also engage the internal gear 7 of a clutch-frame R, that rotates upon tubular extensions of the gear-frame and clutch member H and is provided with a clutch-flange 14, inclined in an opposite direction to the inclination of the clutch-flange 12, and the inner face of which is adapted to be engaged by a clutch-flange 15 of a clutch member T, keyed to slide on but turn with the clutch member F. The faces of the clutch-flanges may be coated with a suitable facing 16 of leather or other material.

The gear-frame D is provided with a disk or web 11, extended at the periphery to form a brake-pulley N, to which is adapted a brake-strap C, and the casing R has formed upon it a pulley M, adapted to receive a brake-strap B, and the various rotative parts, as shown, are supported by ball-bearings which, however, may, if desired, be dispensed with.

While it is essential that the clutch members T F shall slide independently of each other, they are connected so as to rotate together, either by keying the member T to the member F or, as also shown, by extending studs 17 between the two members, which studs also afford supports for intervening coiled springs 18, which tend to separate the members to the extent permitted by collars or nuts 19 upon the studs.

Any suitable means are used for applying the brake-bands B C at will to the pulleys M N and for imparting longitudinal movements to the clutch-sections T F, and by various adjustments of the parts the driven member L and its connections may be rotated at a slow speed, a fast speed, an intermediate speed, or have its direction of rotation reversed. These different results are effected as follows, it being understood that the slow, fast, and intermediate speeds are in a forward direction when the gearing is applied to a motor-vehicle:

*Slow speed.*—To secure this, the brake is applied to arrest the rotation of the pulley N and the gear-frame D, connected therewith. The driving-pinion E then rotates the twin gears G, which in turn drive the clutch member H, and if the clutch members T F are then moved inward the member F will engage the member H and will be rotated thereby, and the sleeve L is driven from the member F with the desired slow movement. With this adjustment the casing or frame constituting the clutch member R will also be rotated by the sections 2 of the twin pulleys; but as the flange 15 of the clutch member T has been carried inward and out of engagement with the flange 14 the rotation of the clutch member R has no effect.

*Fast speed.*—To effect this, both the clutch members T F are carried to the position shown in the drawings, so as to be in engagement with the clutch members R H, both of the brake-bands being free of engagement with the brake-pulleys, and as a result all parts of the mechanism rotate together with the shaft at the same high speed as the latter, the engagement of the clutch members preventing any part of the mechanism from rotating independently of any other part thereof. The entire transmission-gearing is therefore thus locked together when driven at the maximum speed, working as a unit and constituting practically a heavy fly-wheel upon the shaft A.

*Intermediate speed.*—To secure a rotation slower than the maximum speed while faster than the minimum speed, the brake-band B is applied to the pulley M, so as to arrest the rotation of the clutch member R, when the pinion E will drive the twin gears G, so that the sections 2 thereof travel upon the internal gear 7, thereby rotating and driving the sections 3, rotating the brake-clutch H, geared with said sections, and the clutch member F being thrown inward in gear with the clutch member H the sleeve L has imparted to it the intermediate speed.

*Reverse.*—To reverse the rotation of the sleeve L and its connections, the brake-band C is applied to the pulley N, and the clutch member T is moved outward to engage the clutch member R, when the gear-frame D will remain at rest. The pinion E will rotate the twin pinions G backward, and the clutch-frame R will be turned and carry with it the clutch member T and the sleeve L, the clutch member F being also turned, but being disconnected from the clutch member H, which, therefore, is free to turn without any effect.

It will be seen that while the clutch members T F turn together either member may be moved inward or outward independently of the other.

As shown, the casing, which constitutes what I have termed the "clutch member" R, is provided with an internal web 20, bearing upon the sleeve of the clutch member H. This serves to strengthen the parts; but this web 20 may be dispensed with, and the said casing constituting the clutch member R may be a continuous casing inclosing the other parts of the apparatus or may be open, as desired. When the casing is a closed casing and the web 20 is employed, the space between the web and the right-hand side of the casing constitutes practically a closed chamber for the reception of lubricant.

I have referred to the parts M and N as "pulleys" and have shown them as constituting parts of the casing R and the gear-frame D; but they may be attached thereto so as to receive the brake-bands or may be otherwise formed to constitute parts of brakes by means of which either the clutch member R or the gear-frame may be arrested at will.

In order to render the structure as compact as possible, the clutch member H has its web 6 dished or the outer part carried to the right, so that the flange 12 is upon both sides of the vertical plane of the central portion of the web 6 instead of projecting wholly to one side of said plane, and the clutch section or member F is also dished, so that it will be carried within the flange 12 of the member H, as shown. This permits the flange 14 of the member R to be carried inward beneath the flanges 12 and 13, and the member T is also dished, so that its flange 15 may be carried within the flange 14 of the member R, the parts of the clutching devices being thus brought close together in a compact arrangement without interfering with their proper independent movements.

Any suitable means may be employed for applying the brakes to arrest the movements of the parts D and R. As shown, (see Fig. 2,) each brake-band encircles its pulley, the ends of the bands nearly meeting at one side of the pulley, and each end is connected to an arm 21 upon a rock-shaft 23 by means of a link 24, the arms 21 being upon opposite sides of the shaft, so that when the shaft is turned in the direction of its arrow, Fig. 2, the links 24 will be drawn inward and the brake-band tightened.

In order that when the brake is fully applied there may be no tendency of the pressure to relax, each link 24 is so curved that when drawn inward to its full extent the pivot of the arm 21 will be carried past the central vertical plane of the axis of the shaft 23, so that there will be no tendency to rotate the shaft backward by the draft from the link.

Any suitable means may be employed for rocking the shafts 23. As shown, each shaft is provided with an arm 26, and one of these arms is connected by a rod 27 to a lever 28, while the other is connected by a rod 30 to a lever 29, and the lever 28 has an arm 31, terminating in a foot-plate U, while the other has an arm 32, terminating in a foot-plate V, whereby power may be applied from the foot of the operator to turn either of the shafts 23 to apply the brakes. A spring 35 serves to draw back each arm 26 when the pressure of the foot is released.

The sliding movements of the members T F of the two clutches may be effected through any suitable means. As shown, there are two levers 41 42, connected by links 44 45 with rings 50 51, within which the sleeve portions of the clutch members T F may turn freely. In order, however, that the clutch members may be carried longitudinally with the rings, the sleeve portion of each clutch member is grooved externally to correspond to a groove in the surrounding ring, and antifriction-balls in the grooves permit the rotation of the clutch members, but secure the longitudinal movement thereof with the rings.

W is a safety-brake which may be applied from any suitable device.

Without limiting myself to the construction and arrangement shown, I claim—

1. The combination in a three-speed transmission-gear, of a driving-pinion, two friction-clutches, a driven member connected to turn with both clutches, a gear connected with one member of each clutch, and twin pinions engaging the driving-pinion and the gears of the different clutches, substantially as set forth.

2. The combination in a three-speed transmission-gear, of a driving-pinion, two friction-clutches, a driven member connected to turn with both clutches, a gear connected with one member of each clutch, a gear-frame, twin pinions carried by said frame, and brake devices for arresting the rotation of the gear-frame and of the adjacent clutch member, substantially as set forth.

3. The combination in a three-speed transmission-gear, of a driving-pinion, a gear-frame, a plurality of twin pinions carried thereby, a casing supported to rotate about the gear-frame and provided with an internal gear and formed to constitute a clutch member, a coacting clutch member movable longitudinally, and a driven member connected to turn with the latter clutch member, substantially as set forth.

4. The combination in a three-speed transmission-gear, of a driving-pinion, a gear-frame, a plurality of twin pinions carried thereby, a casing supported to rotate about the gear-frame and provided with an internal gear and formed to constitute a clutch member, a coacting clutch member movable longitudinally, a driven member connected to turn with the latter clutch member, a second clutch member turning with the driven member, and a coacting member provided with a gear engaging the twin pinions, substantially as set forth.

5. The combination in a three-speed transmission-gear, of a driving-pinion, a gear-frame, a plurality of twin pinions carried thereby, a casing supported to rotate about the gear-frame and provided with an internal gear and formed to constitute a clutch member, and with a web forming a closed receptacle for lubricant, a coacting clutch member movable longitudinally, and a driven member connected to turn with the latter clutch member, substantially as set forth.

6. The combination in a three-speed transmission-gear, of a driving-pinion, a gear-frame, a plurality of twin pinions carried thereby, a casing supported to rotate about the gear-frame and provided with an internal gear and formed to constitute a clutch member, a coacting clutch member movable longitudinally, a driven member connected to turn with the latter clutch member, and two brake means for arresting the rotation of the gear-frame and of the casing, substantially as set forth.

7. The combination in a three-speed transmission-gear, of a driving-pinion, a gear-frame, a plurality of twin pinions carried thereby, said frame connected with a brake-pulley, a casing constituting a brake-pulley supported to rotate about the gear-frame and provided with an internal gear and formed to constitute a clutch member, a coacting clutch member movable longitudinally, a driven member connected to turn with the latter clutch member, and brake-bands for engaging the brake-pulleys, substantially as set forth.

8. The combination with the driving-pinion, twin pinions engaging the same, a casing, an internal gear also engaging the twin pinions, of an extension of the casing formed to constitute a clutch member, a second clutch member, a gear carried thereby engaging the twin pinions, two sliding clutch members coacting with the others and movable independently, and a driven member connected to turn with the sliding clutch members, substantially as set forth.

9. The combination with the driving-pinion, twin pinions engaging the same, a casing, and internal gear also engaging the twin pinions, of an extension of the casing formed to constitute a clutch member, having an inclined face, a second clutch member also having an inclined face and a gear carried thereby engaging the twin pinions, two sliding clutch members coacting with the others and movable independently, and a driven member connected to turn with the sliding clutch members, substantially as set forth.

10. The combination with the driving-pinion, twin pinions engaging the same, a casing, and internal gear also engaging the twin pinions, of an extension of the casing formed to constitute a clutch member, a second clutch member, a gear carried thereby engaging the twin pinions, two sliding clutch members coacting with the others and movable independently, springs tending to separate said sliding clutch members, and a driven member connected to turn with the sliding clutch members, substantially as set forth.

11. The combination with the casing having a flange constituting a clutch member, of a second clutch member H having a dished web and flange extending from one side of the same, a sliding clutch member F also having a dished web approximately parallel to the other web and with a flange parallel to that carried by the latter web, a second sliding clutch member T having a dished web and a flange engaging that of the casing, a driving-pinion, and gearing between the pinion and the casing and the member H and brakes B, C, and drums engaged thereby substantially as set forth.

12. A three-speed transmission-gear having a driving-pinion, a driven member, two braking devices, two clutch devices, a gear-frame, twin pinions carried thereby, and means whereby one member of one clutch device may be arrested by one of the brake devices, and the rotation of the gear-frame can be arrested by the other brake device, substantially as set forth.

13. The combination with the driving-pinion and driven member, gear-frame, and twin pinions carried thereby, of two clutch members, a gear carried by each member and engaging said twin pinions, and other clutch members coacting with those driven from said pinions, and connected to turn the driven member, substantially as set forth.

14. The combination with the driving-pinion, gear-frame, and twin pinions carried thereby, of two clutch members, a gear carried by each member and engaging said twin pinions, other clutch members coacting with those driven from said pinions, and means for independently sliding the latter clutch members, substantially as set forth.

In testimony whereof I affix my signature in presence of two witnesses.

WILLIAM FOLBERTH.

Witnesses:
  CHARLES E. FOSTER,
  B. C. RUST.